US008621764B2

(12) United States Patent
Puckett

(10) Patent No.: US 8,621,764 B2
(45) Date of Patent: Jan. 7, 2014

(54) GELATIN CAPSULE FORMULATION AND DRYING SYSTEM

(76) Inventor: John Puckett, Ferndale, WA (US)

(*) Notice: Subject to any disclaimer, the term of this patent is extended or adjusted under 35 U.S.C. 154(b) by 329 days.

(21) Appl. No.: 13/049,737

(22) Filed: Mar. 16, 2011

(65) Prior Publication Data

US 2012/0233875 A1    Sep. 20, 2012

(51) Int. Cl.
*F26B 5/00*    (2006.01)
(52) U.S. Cl.
USPC ............. 34/443; 34/130; 361/699; 62/259.2; 165/104.33
(58) Field of Classification Search
USPC ........... 34/380, 381, 413, 443, 497; 361/698, 361/699; 62/259.2; 165/80.4, 104.33
See application file for complete search history.

(56) References Cited

U.S. PATENT DOCUMENTS

| 1,450,917 | A |   | 4/1923  | Goldthorpe |
|-----------|---|---|---------|------------|
| 1,516,663 | A |   | 11/1924 | Beveridge |
| 1,978,829 | A |   | 10/1934 | Wilkie |
| 1,981,806 | A |   | 11/1934 | Lowry |
| 2,638,686 | A |   | 11/1950 | Stirn et al. |
| 2,600,367 | A |   | 6/1952  | Stim et al. |
| 2,851,786 | A |   | 9/1958  | Scherer |
| 2,877,563 | A |   | 3/1959  | Scherer |
| 2,937,454 | A |   | 5/1960  | Scott et al. |
| 2,975,752 | A |   | 3/1961  | Vaughan |
| 3,815,257 | A |   | 6/1974  | Freze |
| 4,015,930 | A | * | 4/1977  | Grantham ...................... 432/105 |
| 4,330,561 | A |   | 5/1982  | Nemoto et al. |
| 4,428,927 | A |   | 1/1984  | Ebert et al. |
| 4,507,080 | A | * | 3/1985  | Freze ............................. 432/105 |
| 4,734,149 | A |   | 3/1988  | Brown |
| 4,744,988 | A |   | 5/1988  | Brox |
| 4,780,316 | A |   | 10/1988 | Brox |
| 4,816,259 | A |   | 3/1989  | Matthews et al. |
| 4,935,243 | A |   | 6/1990  | Borkan et al. |
| 5,200,191 | A |   | 4/1993  | Steele et al. |
| 5,669,157 | A | * | 9/1997  | Kuipers ........................ 34/321 |
| 5,735,105 | A |   | 4/1998  | Stroud |
| 5,940,270 | A | * | 8/1999  | Puckett ........................ 361/699 |
| 6,105,273 | A |   | 8/2000  | Johanson |
| 6,195,911 | B1 |  | 3/2001  | Brehant et al. |
| 6,258,380 | B1 |  | 7/2001  | Overholt |
| 6,655,046 | B2 |  | 12/2003 | Schafer et al. |

(Continued)

FOREIGN PATENT DOCUMENTS

DE    19833624 A1 *  1/2000  ............... B03B 9/00
DE    102005036804 A1 *  2/2007

(Continued)

OTHER PUBLICATIONS

International Search Report and Written Opinion issued on Jun. 20, 2012 in related PCT/US2012/028814 application.

*Primary Examiner* — Steve M Gravini
(74) *Attorney, Agent, or Firm* — John Puckett; Barleans

(57) ABSTRACT

A gelatin capsule drying system that includes a structure divided into first, second and third zones, a first air handler unit positioned to discharge air into the first zone, a second air handler unit positioned to discharge air into the second zone and a third air handler unit positioned to discharge air into the third zone. The system further includes a series of tumble dryers that extend from the first zone, through the second zone and into the third zone, and an HVAC unit that provides air to the first, second and third air handler units.

21 Claims, 8 Drawing Sheets

(56) References Cited

U.S. PATENT DOCUMENTS

| | | |
|---|---|---|
| 7,078,054 B2 | 7/2006 | Brox et al. |
| RE39,347 E | 10/2006 | Ikemoto |
| 7,246,451 B2 * | 7/2007 | Victorov et al. ............... 34/129 |
| 7,627,960 B2 * | 12/2009 | Beyerle et al. ................. 34/602 |
| 7,662,406 B1 | 2/2010 | Xie et al. |
| 2005/0152969 A1 | 7/2005 | Chiprich |
| 2005/0214361 A1 | 9/2005 | Mitzutani et al. |
| 2006/0070254 A1 * | 4/2006 | Victorov et al. ................ 34/58 |
| 2006/0088590 A1 | 4/2006 | Sukuru et al. |
| 2006/0275361 A1 | 12/2006 | Sakanishi |
| 2007/0259035 A1 | 11/2007 | Chiprich |
| 2007/0289157 A1 | 12/2007 | Kim |
| 2008/0000099 A1 | 1/2008 | Victorov et al. |
| 2010/0021535 A1 | 1/2010 | Mitzutani et al. |
| 2012/0233875 A1 * | 9/2012 | Puckett ........................ 34/443 |

FOREIGN PATENT DOCUMENTS

| | | | |
|---|---|---|---|
| JP | 06262243 A * | 9/1994 | ............. B21B 45/06 |
| JP | 07239131 A * | 9/1995 | ............... F24F 1/00 |
| JP | 2012179335 A * | 9/2012 | |

\* cited by examiner

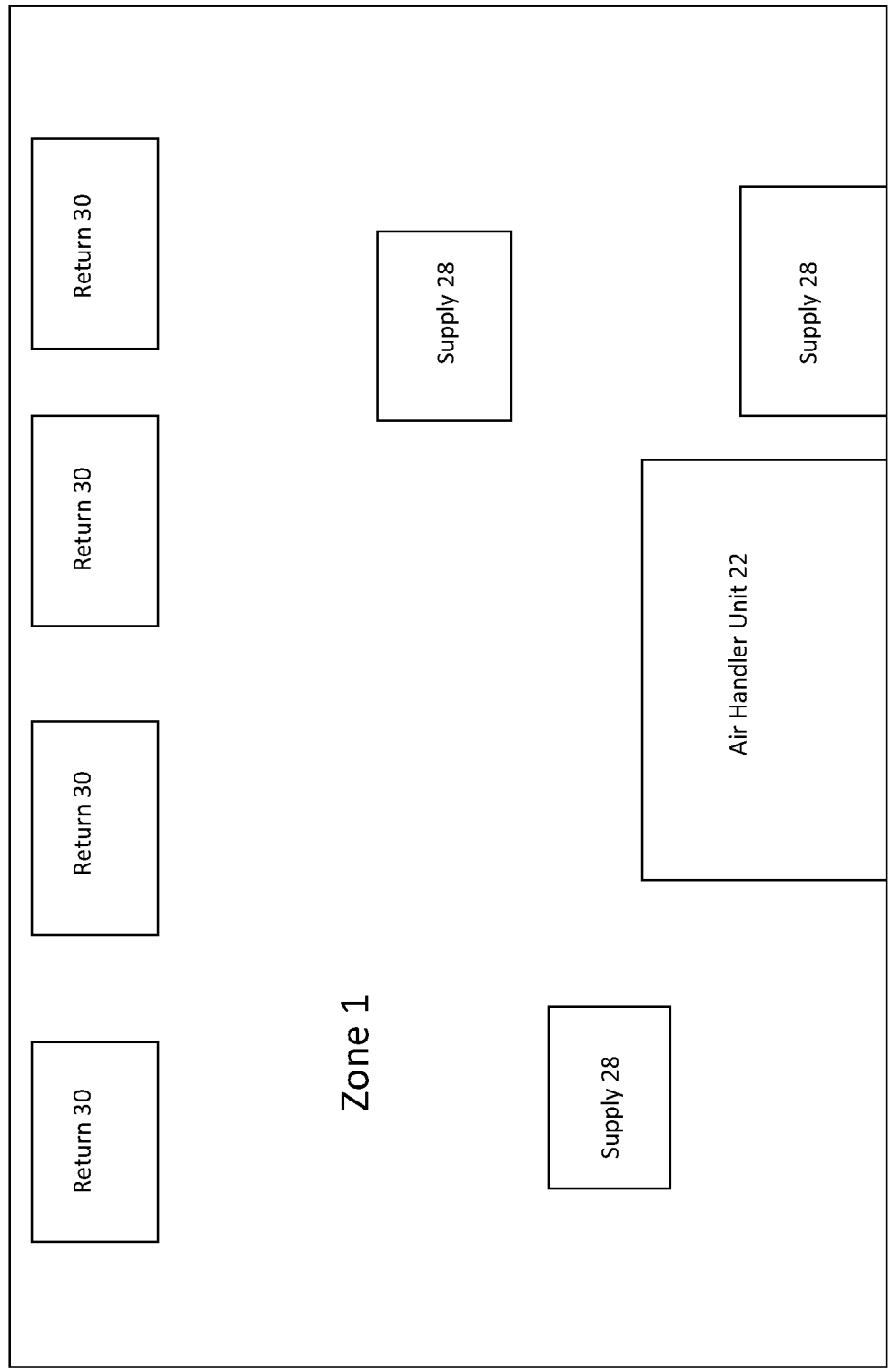

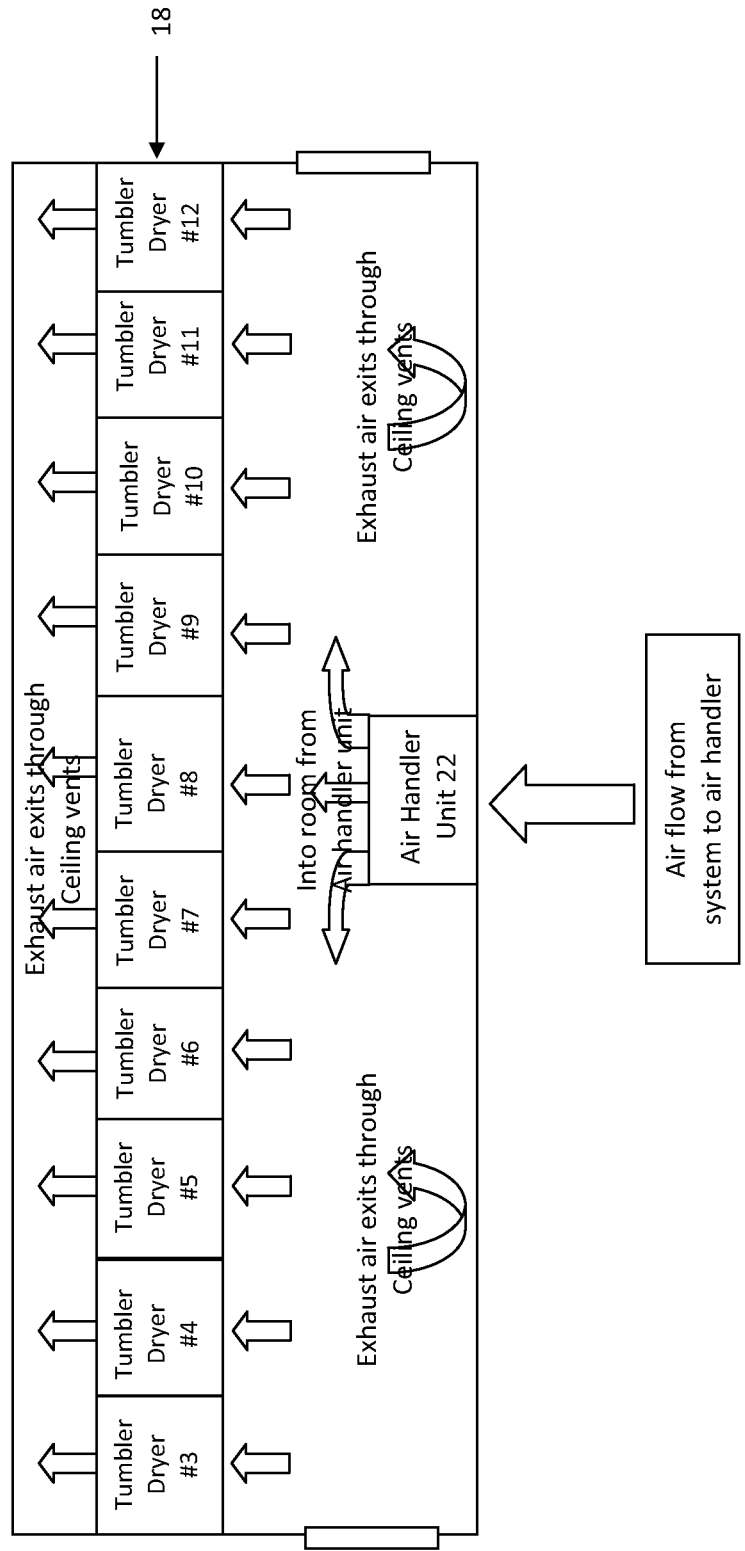

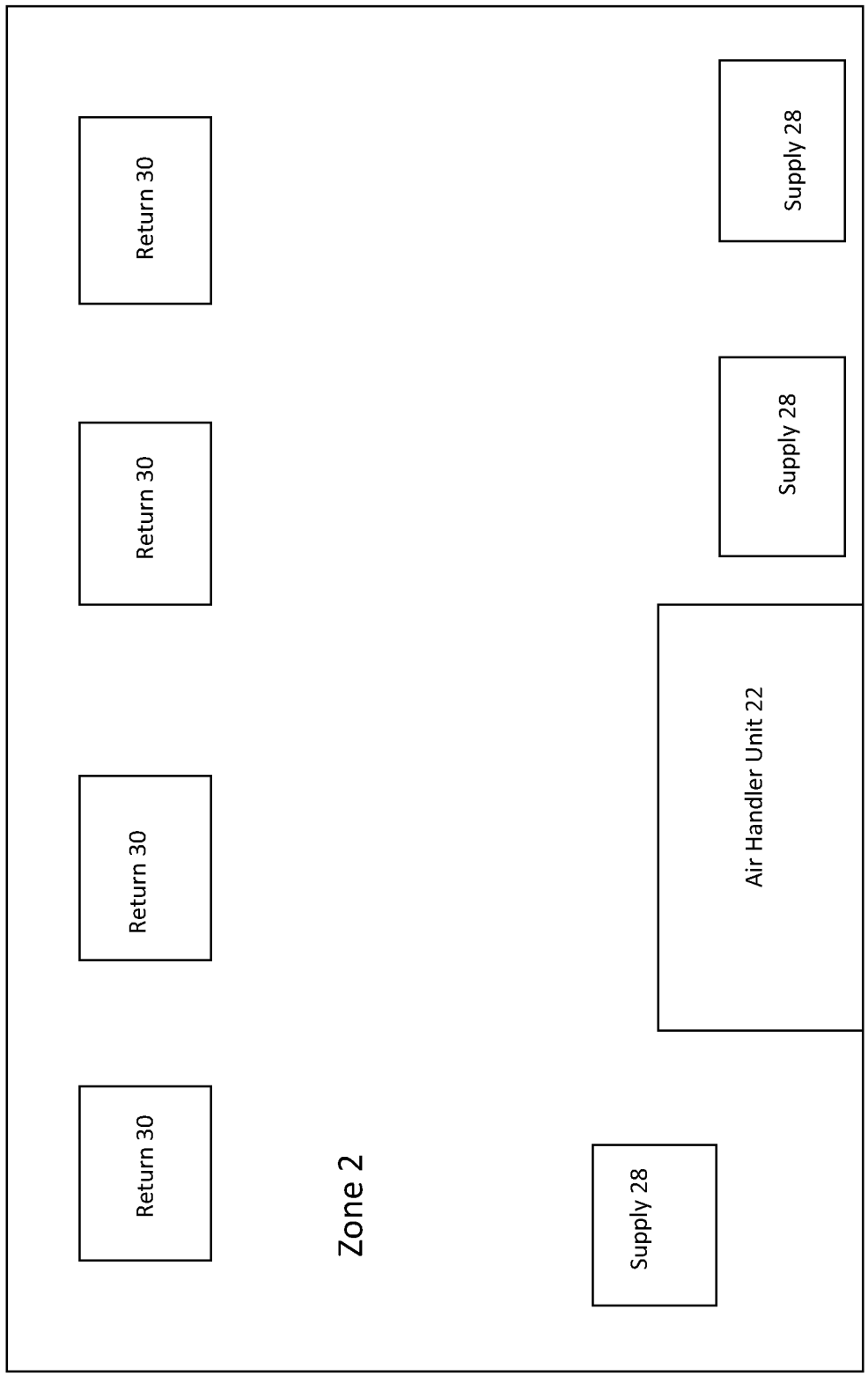

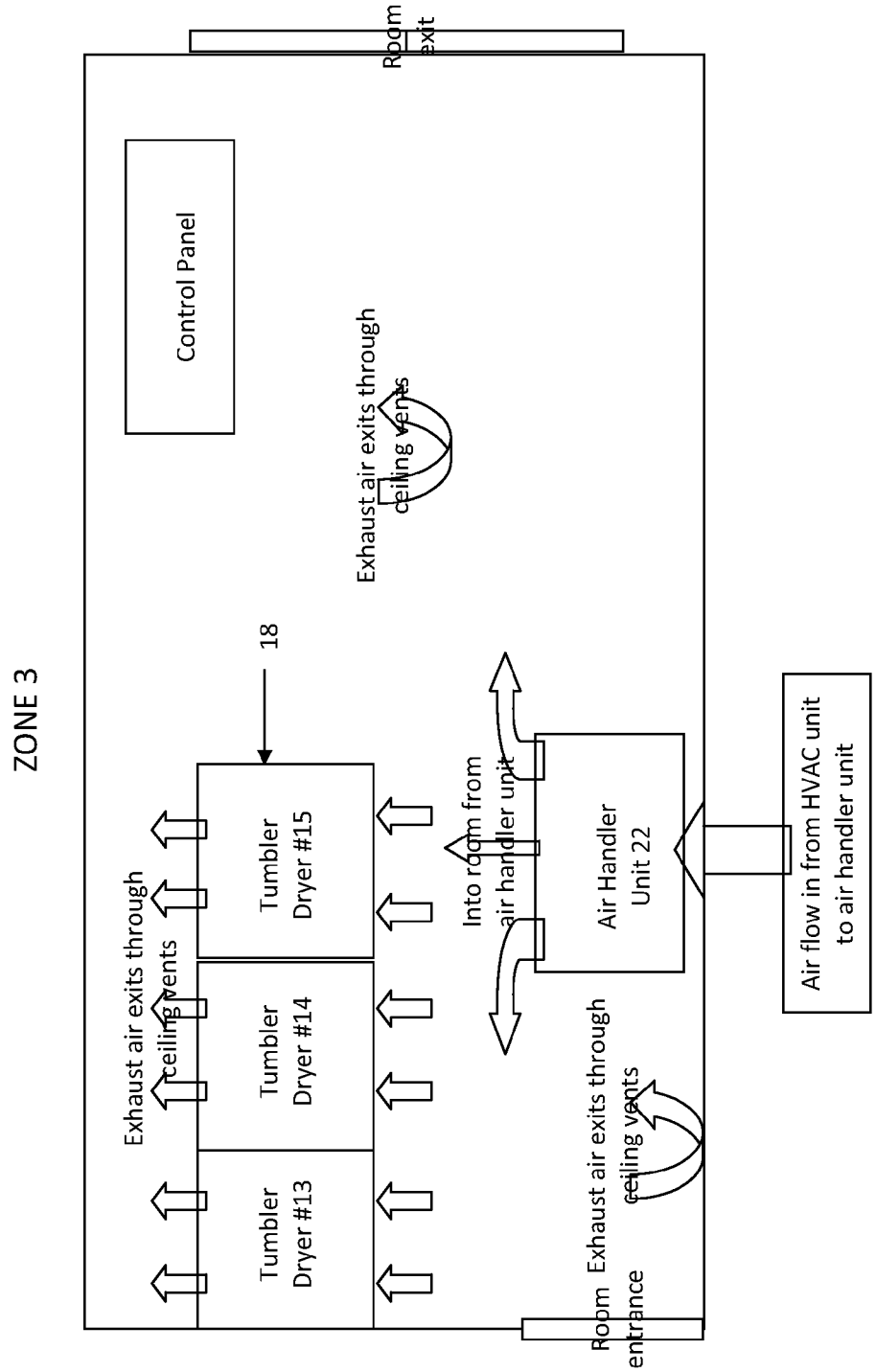

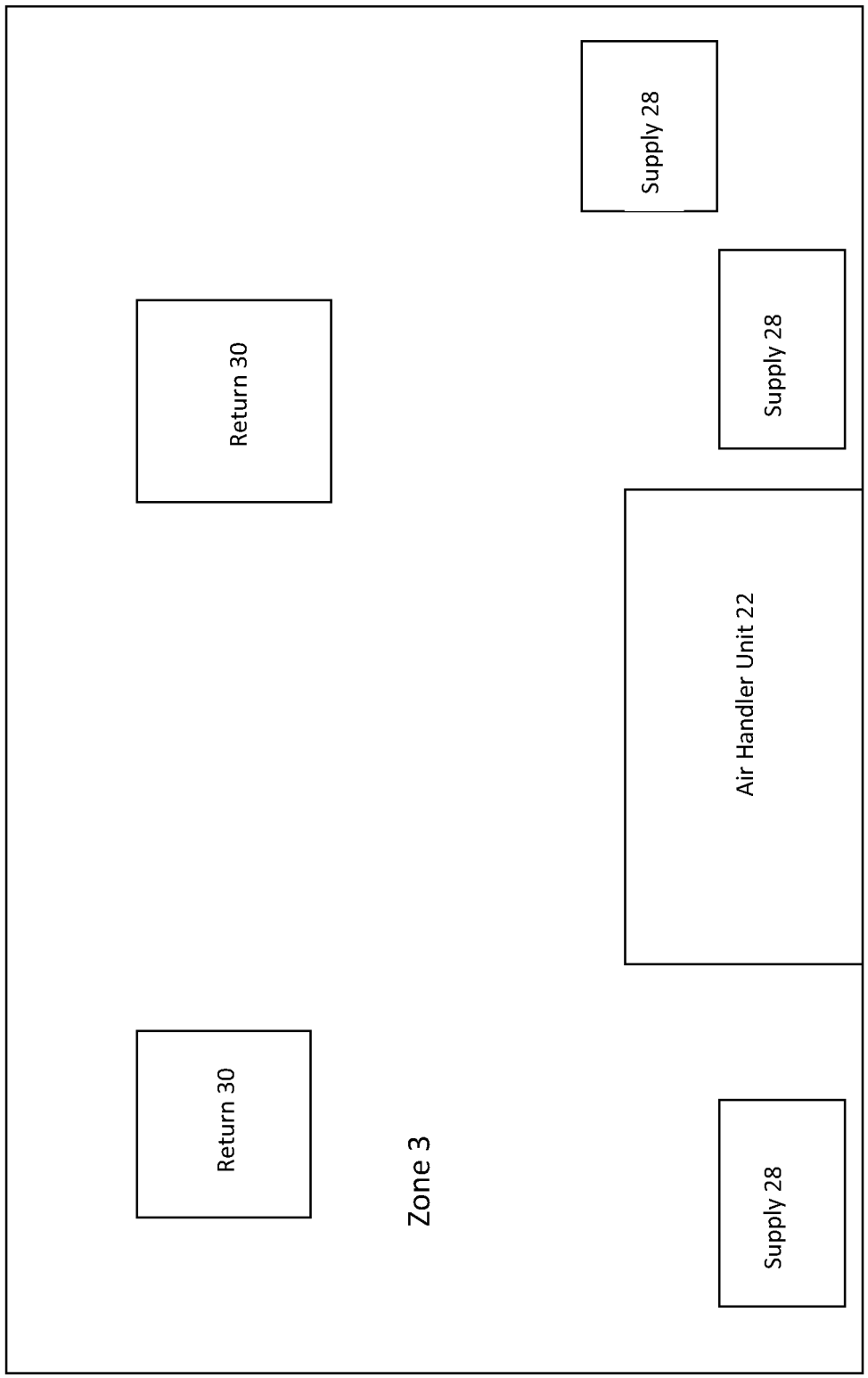

GELATIN CAPSULE FORMULATION AND DRYING SYSTEM

FIELD OF THE INVENTION

The present invention relates to a gelatin capsule manufacturing and drying process.

BACKGROUND OF THE INVENTION

The gelatin capsule or softgel is a one-piece, hermetically sealed soft gelatin shell containing a liquid, a suspension, or a semi-solid. One challenge for softgel manufacturers is the length of time it takes to dry the shell to a hardness where the softgel can be packaged. Many softgel manufacturers utilize pre-drying units, then spread the capsules onto trays and place the frays into drying tunnels. Once the product is put into the drying tunnels, it can take up to seven days to complete drying of the shell. Shorter drying times are desirable.

SUMMARY OF THE PREFERRED EMBODIMENTS

In accordance with a first aspect of the present invention there is provided a gelatin capsule drying system that includes a structure divided into first, second and third zones, a first air handler unit positioned to discharge air into the first zone, a second air handler unit positioned to discharge air into the second zone and a third air handler unit positioned to discharge air into the third zone. The system further includes a series of tumble dryers that extend from the first zone, through the second zone and into the third zone, and an HVAC unit that provides air to the first, second and third air handler units.

In a preferred embodiment, the HVAC unit provides air to the first, second and third air handler units at a first condition, the first air handler unit releases air into the first zone at a second condition, the second air handler unit releases air into the second zone at a third condition, and the third air handler unit releases air into the third zone at a fourth condition.

In a preferred embodiment, the second condition includes a second temperature, a second relative humidity and a second dew point, the third condition includes a third temperature, a third relative humidity and a third dew point, and the fourth condition includes a fourth temperature, a fourth relative humidity and a fourth dew point. The second temperature is between about 50° F. and about 68° F., the second relative humidity is between about 19% and about 23%, the second dew point is between about 15° F. and about 30° F., the third temperature is between about 72° F. and about 87° F., the third relative humidity is between about 9% and about 14%, the third dew point is between about 15° F. and about 23° F., the fourth temperature is between about 68° F. and about 74° F., the fourth relative humidity is between about 10% and about 15%, and the fourth dew point is between about 15° F. and about 23° F.

In a preferred embodiment, the first air handler unit is capable of releasing air into the first zone at between about 3000 CFM and about 6000 CFM, the second air handler unit is capable of releasing air into the second zone at between about 2500 CFM and about 5000 CFM, and the third air handler unit is capable of releasing air into the third zone at between about 1000 CFM and about 3000 CFM.

In a preferred embodiment, the gelatin capsule drying system further includes a chiller for providing chilled water to the HVAC unit and the first, second and third air handler units and the first, second and third air handler units are positioned within the first, second and third zones, respectively.

In accordance with another aspect of the present invention, there is provided a method of drying gelatin capsules encapsulating a fill. The method includes the steps of dividing a space into first, second and third zones, providing a first air handler unit for discharging air into the first zone, a second air handler unit for discharging air into the second zone, and a third air handler unit for discharging air into the third zone. The method further includes providing air to the first air handler unit at a first temperature and a first relative humidity, wherein the air within the first air handler unit is conditioned such that it has a second temperature and a second relative humidity, wherein the conditioned air is released from the first air handler unit into the first zone. The method further includes providing air to the second air handler unit at the first temperature and the first relative humidity, wherein the air within the second air handler unit is conditioned such that it has a third temperature and a third relative humidity, wherein the conditioned air is released from the second air handler unit into the second zone. The method further includes providing air to the third air handler unit at the first temperature and the first relative humidity, wherein the air within the third air handler unit is conditioned such that it has a fourth temperature and a fourth relative humidity, wherein the conditioned air is released from the third air handler unit into the third zone. The method further includes providing a series of tumble dryers that extends from the first zone, through the second zone and into the third, and drying the gelatin capsules by moving the gelatin capsules through the tumble dryers from the first zone to the third zone.

In a preferred embodiment, the air that is provided to the first, second and third air handler units is provided by a HVAC unit that is positioned outside of the first, second and third zones.

In a preferred embodiment, the air provided to the first, second and third air handler units has a first dew point, the air within the first air handler unit is conditioned such that it has a second dew point, the air within the second air handler unit is conditioned such that it has a third dew point and the air within the third air handler unit is conditioned such that it has a fourth dew point. The second dew point is between about 15° F. and about 30° F., the third dew point is between about 15° F. and about 23° F., and the fourth dew point is between about 15° F. and about 23° F.

It will be understood that the first, second, third and fourth temperatures can be the same, different or any combination thereof. The first, second, third and fourth dew points can be the same, different or any combination thereof. The first, second, third and fourth relative humidities can be the same, different or any combination thereof. The first, second, third and fourth conditions can be the same, different or any combination thereof.

In a preferred embodiment, the gelatin capsules can be dried to a hardness of eight newtons in about thirteen hours. The first, second and third air handler units can be positioned within the first, second and third zones, respectively.

In accordance with another aspect of the present invention, there is provided a method of drying a softgel. The method includes the steps of providing air from an HVAC unit to first, second and third air handler units, wherein the first, second and third air handler units can blow air therefrom, exposing the softgel to the air blown from the first air handler unit, exposing the softgel to the air blown from the second air handler unit, and exposing the softgel to the air blown from the third air handler unit.

In a preferred embodiment, the air provided by the HVAC unit to the first, second and third air handler units is at a first condition, the air blown from the first air handler unit is at a second condition, the air blown from the second air handler unit is at a third condition. and the air blown from the third air handler unit is at a fourth condition.

The invention, together with additional features and advantages thereof, may be best understood by reference to the following description.

BRIEF DESCRIPTION OF THE DRAWINGS

FIG. 4 is a schematic of the ducting system of zone 1 of the drying system of FIG. 1;

FIG. 5 is a schematic of zone 2 of the drying system of FIG. 1;

FIG. 6 is a schematic of the ducting system of zone 2 of the drying system of FIG. 1;

FIG. 7 is a schematic of zone 3 of the drying system of FIG. 1; and

FIG. 8 is a schematic of the ducting system of zone 3 of the drying system of FIG.

DETAILED DESCRIPTION OF THE PREFERRED EMBODIMENTS

Figure 1:
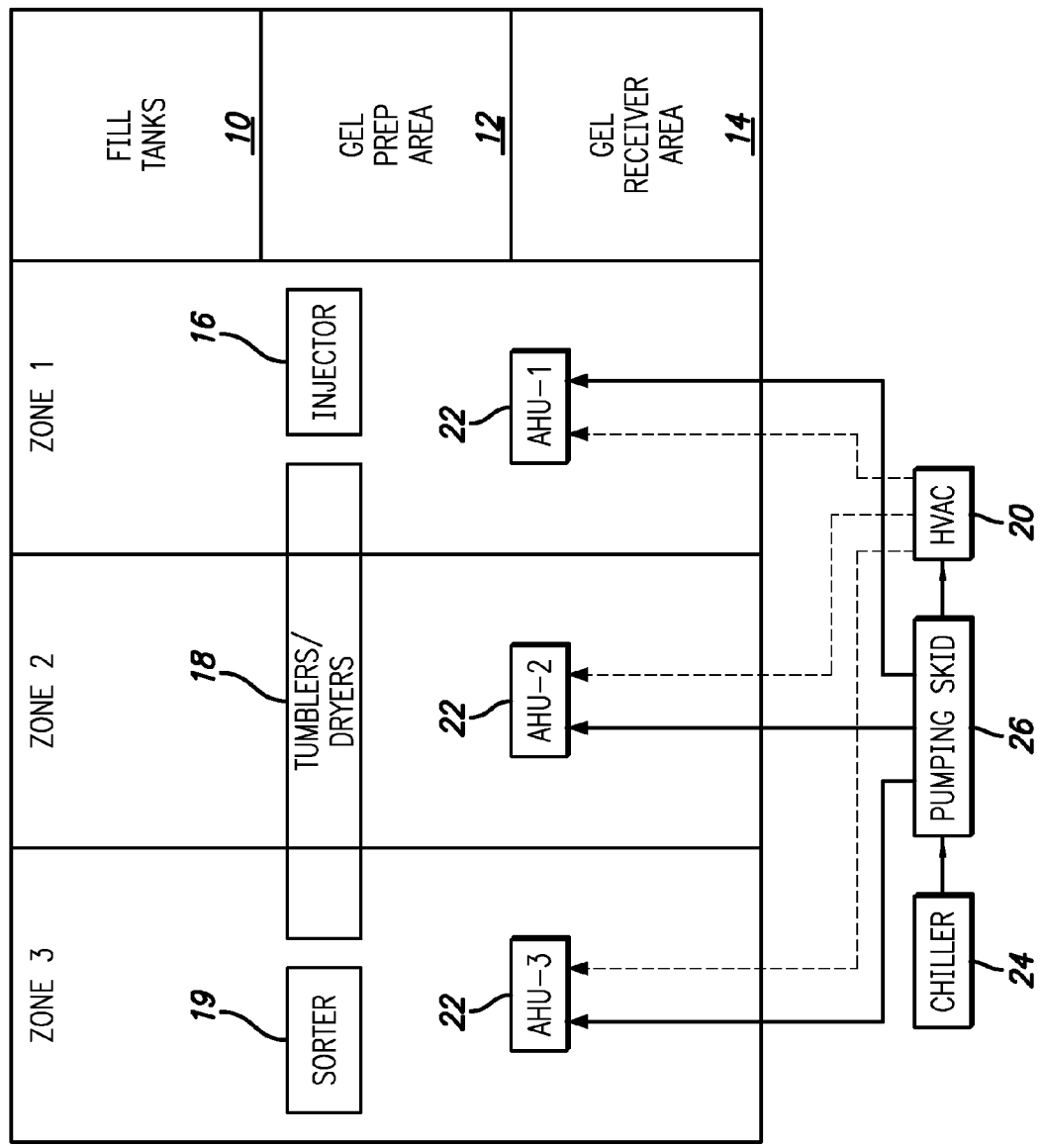
FIG. 1 is a schematic showing a three zone drying system in accordance with a preferred embodiment of the present invention.
Figure 2:
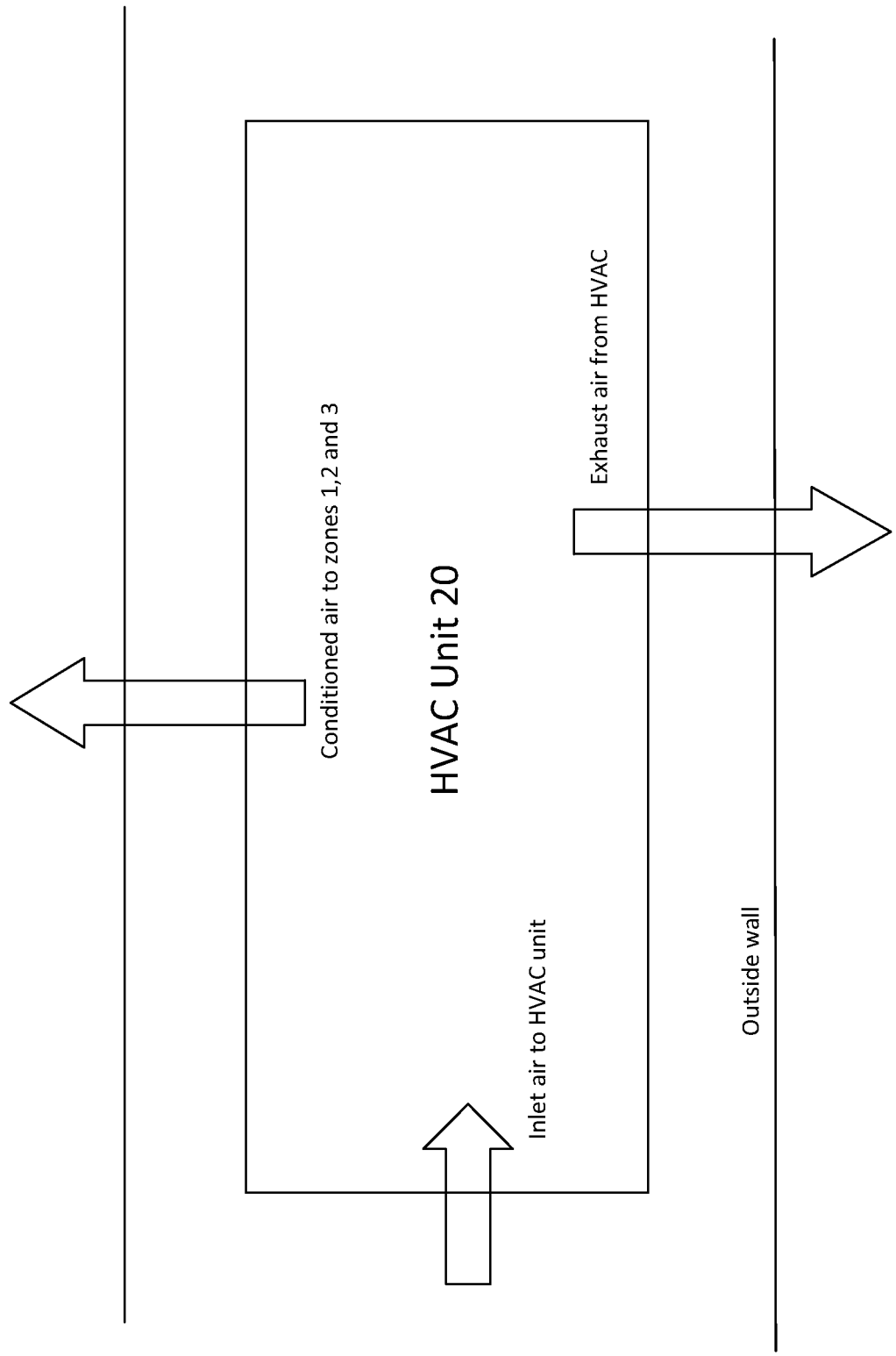
FIG. 2 is a schematic showing the HVAC unit of the drying system of FIG. 1.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," and "below" used herein are merely for ease of description and refer to the orientation of the components as shown in the figures. It should be understood that any orientation of the components described herein is within the scope of the present invention.

Referring now to the drawings, wherein the showings are for purposes of illustrating the present invention and not for purposes of limiting the same, FIGS. 1-8 show in block diagram form a softgel drying system in accordance with a preferred embodiment of the present invention. It should be understood that the process described and shown herein is described as performed within a manufacturing warehouse/building. This is done for illustrative purposes only and for ease of understanding and is not considered limiting in any way.

As can be seen from the block layout in FIG. 1, the building includes an area for fill tanks 10, a gel prep area 12 and a gel receiver area 14. These areas can be within the same room or in separate rooms. The building also includes three separate zones/rooms in which the drying process occurs (described below). Each zone is also supplied with sensors for monitoring temperature and humidity, among other conditions. The system includes a dehumidifier/HVAC unit 20, chiller 24, control panels for controlling the conditions of each of the zones, ducting, water lines, electrical schematics, and three air handler units 22. Each air handler unit 22 is capable of cooling and heating within each zone.

Generally, the softgels are manufactured according to the following process: 1. The product is transferred from bulk storage to the fill tanks 10 where the product is agitated continuously. 2. In the gel prep area 12, raw gelatin is placed in a gel prep tank/reactor and is liquefied. 3. The gelatin is aged in the gel receiver area 14. 4. The fill product is encapsulated in a capsule injector 16, thereby forming a softgel. 5. The softgels are cured as they are processed through a series of tumble dryers 18. 6. A sorter 19 sorts and removes defective softgels. In an exemplary embodiment, the inventor has found that softgels can be dried to a hardness of eight newtons in about thirteen hours. A 1000 mg capsule can be dried to a desired level in under 12 hours.

The softgels are generally prepared by encapsulating a medicated fill in a gelatin shell. The shells and fills are prepared according to formulations well known to those of skill in the art. Accordingly, the system and process set forth above can be used for drying any softgel. However, in a preferred embodiment, the system is used to dry softgels having a desired formula and steps for preparation. An exemplary batch for the preferred gelatin formulation is 219.0 kg of gelatin 150 bloom, 110.0 kg of glycerin 99.5%, and 172.5 kg of purified water and 6.5 kg of caramel color. In a preferred embodiment, the softgels include between about 37% and about 41% 150 bloom bovine gelatin, between about 17% and about 21% glycerine and between about 25% and about 29% water.

In a preferred embodiment, the process for making the softgel shell (step 2 above) includes the following steps: Pre-weigh all raw materials into clean containers. Add glycerin and purified water to the gelatin melter (which is set in an exemplary embodiment to 176° F.). Turn on the mixer and leave mixing. Once the mixer reaches about 176° F. add the pre-weighed raw gelatin. Apply vacuum to allow the liquids to rise and saturate the gelatin. Turn off the vacuum, but leave the tank sealed with the vacuum. Leave on the mixer/agitator and allow the gelatin to mix for 30 minutes. Deaerate the gelatin. Leave the vacuum valve on the gelatin melter closed to seal the vacuum and turn off the vacuum pump. Allow the gelatin to mix under sealed vacuum for 10 minutes at slow mixing speed, or until the temperature is between about 149° F. to about 158° F.

Step 5 above (the softgels are cured as they are processed through a series of tumble dryers 18) will now be described in more detail. During the process, the softgels pass through the series of tumble dryers 18 (also referred to herein as a tumble drying line 18) that reside in and span three separate air conditioning zones or rooms (labeled zone 1, zone 2 and zone 3 in the figures). It will be appreciated that there could be as few as three tumble dryers; one in each zone. In a preferred embodiment, the zones are separate rooms that are separated by walls or other partitions. However, in another embodiment, the zones can be all located within the same room or space.

Preferably, each zone is maintained at a predetermined temperature and relative humidity condition. The preferred equipment for maintaining the zones at the desired temperature and humidity and providing the desired air flow within each zone is described below. Generally, in zone 1, the ambient temperature is kept cool to allow the softgel to set immediately after conception. In zone 2, the temperature is set higher than zone 1 so that it drives out the moisture in the softgel shell and the humidity is lower than zone 1 to help the moisture evaporate from the softgel in a timely manner. In zone 3, the conditions again change to allow the softgel a slower drying process for the remaining moisture to evaporate from the shell.

In a preferred embodiment, the temperature in zone 1 is between about 50° F. and about 68° F. In a more preferred embodiment, the temperature in zone 1 is between about 59° F. and about 61° F. In the most preferred embodiment, the temperature in zone 1 is about 60° F. In a preferred embodiment, the relative humidity in zone 1 is between about 19% and about 23%. In a more preferred embodiment, the relative humidity in zone 1 is between about 20.5% and about 21.5%. In the most preferred embodiment, the relative humidity in zone 1 is about 21%. In a preferred embodiment, the dew point in zone 1 is between about 15° F. and about 30° F. In a more preferred embodiment, the dew point in zone 1 is between about 24° F. and about 26° F. In the most preferred embodiment, the dew point in zone 1 is about 25° F.

In a preferred embodiment, the temperature in zone 2 is between about 72° F. and about 87° F. In a more preferred embodiment, the temperature in zone 2 is between about 81° F. and about 83° F. In the most preferred embodiment, the temperature in zone 2 is about 82° F. In a preferred embodiment, the relative humidity in zone 2 is between about 9% and about 14%. In a more preferred embodiment, the relative humidity in zone 2 is between about 10.5% and about 11.5%. In the most preferred embodiment, the relative humidity in zone 2 is about 11%. In a preferred embodiment, the dew point in zone 2 is between about 15° F. and about 23° F. In a more preferred embodiment, the dew point in zone 2 is between about 19° F. and about 21° F. In the most preferred embodiment, the dew point in zone 2 is about 20° F.

In a preferred embodiment, the temperature in zone 3 is between about 68° F. and about 74° F. In a more preferred embodiment, the temperature in zone 3 is between about 71° F. and about 73° F. In the most preferred embodiment, the temperature in zone 3 is about 72° F. In a preferred embodiment, the relative humidity in zone 3 is between about 10% and about 15%. In a more preferred embodiment, the relative humidity in zone 3 is between about 12.5% and about 13.5%. In the most preferred embodiment, the relative humidity in zone 3 is about 13%. In a preferred embodiment, the dew point in zone 3 is between about 15° F. and about 23° F. In a more preferred embodiment, the dew point in zone 3 is between about 19° F. and about 21° F. In the most preferred embodiment, the dew point in zone 3 is about 20° F.

It should be understood that the temperatures and humidities set forth above are preferred for the particular gelatin capsule formulation set forth above and can vary for other formulations based on a variety of factors, such as the gelatin formulation and/or the fill formulation.

The temperature, humidity and dew point conditions set forth above are provided by an HVAC unit 20 together with an air handler unit 22 within each zone. As can be seen in FIG. 1, in a preferred embodiment, the HVAC unit 20, provides conditioned air to the air handler unit 22 within each zone. The air is conditioned by the air handler unit 22 after it leaves the HVAC unit 20 and prior to entering each zone/room atmosphere. Within each zone, the resident air handler unit 22 is capable of adjusting the temperature, dew point and humidity of the air prior to its release into the air/room atmosphere.

It will be appreciated by those skilled in the art that the air handler units 22 blow the conditioned air over the softgels as they move through the tumbler drying line 18. Cubic feet per minute (CFM) is a standard measurement of airflow indicating how many cubic feet of air pass a point in one minute. In a preferred embodiment, the zone 1 air handler unit 22 outputs air at between about 3000 CFM and about 6000 CFM. In a more preferred embodiment, the zone 1 air handler unit 22 outputs air at about 4000 CFM and about 5000 CFM. In the most preferred embodiment, the zone 1 air handler unit 22 outputs air at about 4500 CFM to about 4700 CFM. In a preferred embodiment, the zone 2 air handler unit 22 outputs air at between about 2500 CFM and about 5000 CFM. In a more preferred embodiment, the zone 2 air handler unit 22 outputs air at about 3000 CFM and about 4500 CFM. In the most preferred embodiment, the zone 2 air handler unit 22 outputs air at about 3900 CFM to about 4100 CFM. In a preferred embodiment, the zone 3 air handler unit 22 outputs air at between about 1000 CFM and about 3000 CFM. In a more preferred embodiment, the zone 3 air handler unit 22 outputs air at about 1500 CFM and about 2500 CFM. In the most preferred embodiment, the zone 3 air handler unit 22 outputs air at about 2100 CFM to about 2300 CFM.

Figure 3:
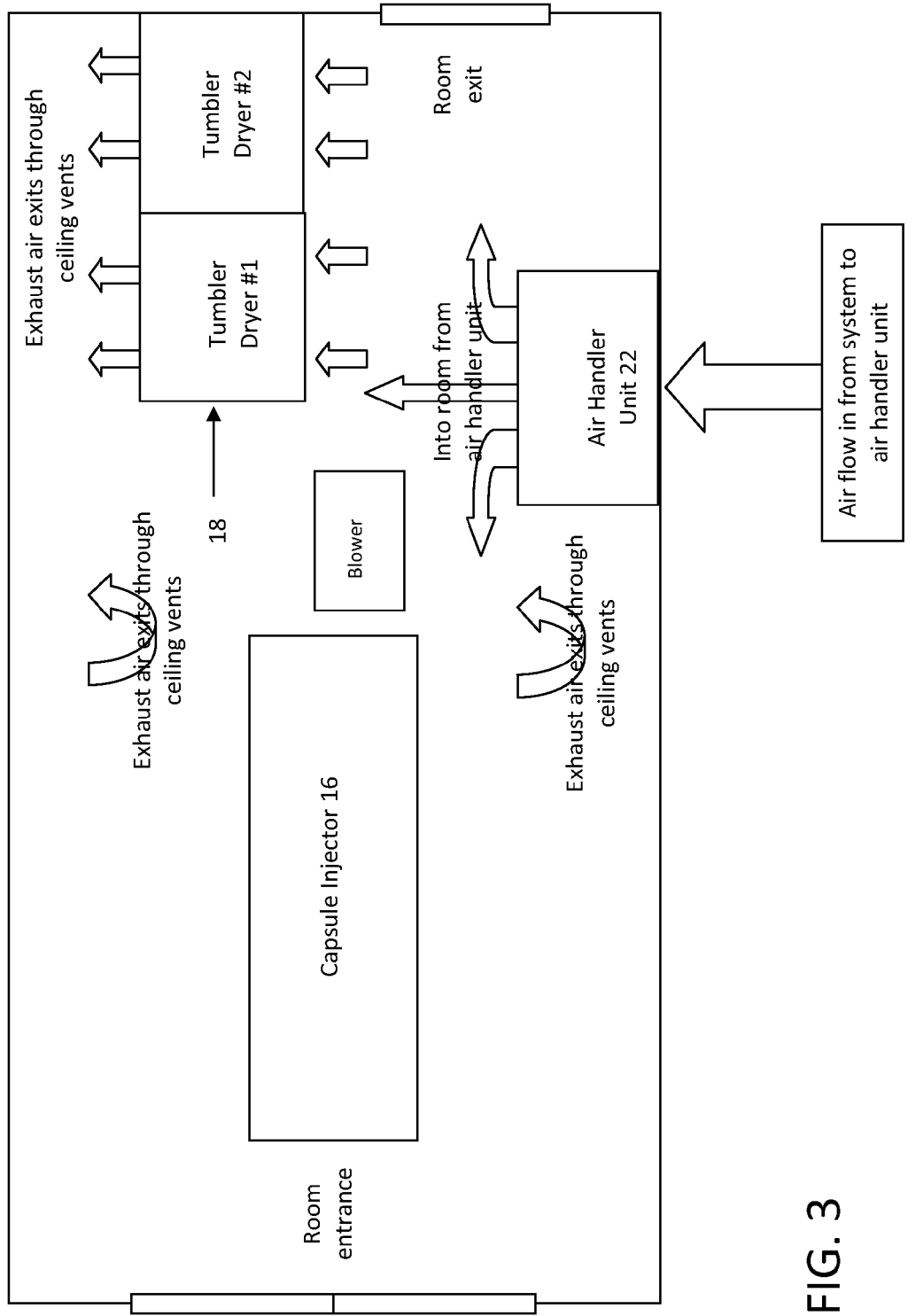
FIG. 3 is a schematic of zone 1 of the drying system of FIG. 1.

FIGS. 3, 5 and 7 show the location of the air handler units 22, tumble drying line 18 and other components within each zone. The components shown in these figures are generally positioned or mounted on the floor of the zone. In the exemplary embodiment, the system includes two tumble dryers in zone 1, ten tumble dryers in zone 2 and three tumble dryers in zone 3, for a total of fifteen tumble dryers. However, it will be appreciated by those skilled in the art that any number of tumble dryers can be located within each zone. It will be understood that as the softgels pass through the various tumble dryers 18, air from the air handler unit 22 within the zone is blown over the softgels.

FIGS. 4, 6 and 8 show the air handler unit 22 within each zone together with the location of the supply and exhaust/return vents 28 and 30. It will be understood that the supply and exhaust vents 28 and 30 are located within ducting that is located at the top of each zone. In another embodiment, the ducting can be located in other portions of the zones (e.g., along the floor). In FIGS. 4, 6 and 8, the supply vent 28 closest to the air handler unit 22 ducts air directly to the air handler unit. The other two supply vents 30 supply air directly to the zone. The number of supply and exhaust/return vents 28 and 30 is not a limitation on the present invention. Any number of supply or exhaust/return vents are within the scope of the invention.

In an exemplary embodiment, the HVAC unit 20 is a Bry-Air® Dehumidifier model VFB 150 that provides up to 16,500 CFM of process air at between about 68° F. to about 75° F. and between about 8% and about 14% relative humidity and at a dew point of between about 13° F. and about 18° F. In a preferred embodiment, at least some of the process air from the HVAC unit is routed to the air handler units 22. Within each zone, the air handler unit 22 checks (via sensors) temperature, humidity, and dew point. Within the air handler unit 22, the air is adjusted or conditioned so that it is at the desired temperature, humidity, and dew point and then it is released into the zone/room. In an exemplary embodiment, the air handler units 22 are Canatal® air handler units that provide recirculation airflow within each zone to help prevent stagnant/stratification areas with each zone. The air handler units 22 each include a blower, heater and chiller therein for providing the desired air conditions and the desired air flow. As is described above, in a preferred embodiment, the air handler unit 22 in zone 1 is more powerful than the air handler units in zones 2 and 3. However, this is not a limitation on the present invention.

In a preferred embodiment, the system includes a chiller 24 and pumping skid 26 that together provide cooled water to the HVAC unit 20 and air handler units 22 to help cool the process air as desired. In an exemplary embodiment, the chiller 24 is a Carrier® chiller that provides chilled water at about 45° F. that is piped to the pumping skid 26. In an exemplary embodiment, the pumping skid 26 includes two chilled water pumps with a chilled water storage tank. The pumps circulate the chilled water to chilled water coils in the HVAC unit 20 and each zone air handler unit 22. In FIG. 1, the water supply is represented by the arrows with solid lines and the air supply is represented by the arrows with dashed lines. The chilled water helps each air handler unit 22 to condition the air as desired and as detailed above.

Once the softgels have moved through the tumble drying line 18 and have been subject to the drying conditions within each zone, they are then sorted in the sorter 19 and are ready for packaging.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed, at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A gelatin capsule drying system comprising:
   a structure divided into first, second and third zones, wherein the first zone includes a first temperature sensor, wherein the second zone includes a second temperature sensor, and wherein the third zone includes a third temperature sensor,
   a first air handler unit positioned to discharge air into the first zone, wherein the first air handler unit is in communication with the first temperature sensor, a second air handler unit positioned to discharge air into the second zone, wherein the second air handler unit is in communication with the second temperature sensor, and a third air handler unit positioned to discharge air into the third zone, wherein the third air handler unit is in communication with the third temperature sensor,
   a series of tumble dryers that extend from the first zone, through the second zone and into the third zone, and
   an HVAC unit that provides air to the first, second and third air handler units.

2. The gelatin capsule drying system of claim 1 wherein the HVAC unit provides air to the first, second and third air handler units at a first condition, wherein the first air handler unit is controlled independently of the HVAC unit, and releases air into the first zone at a second condition, wherein the second air handler unit is controlled independently of the HVAC unit, and releases air into the second zone at a third condition, and wherein the third air handler unit is controlled independently of the HVAC unit, and releases air into the third zone at a fourth condition.

3. The gelatin capsule drying system of claim 2 wherein the second condition includes a second temperature, a second relative humidity and a second dew point, wherein the first air handler unit includes the capability of controlling the second temperature, the second relative humidity and the second dew point, the third condition includes a third temperature, a third relative humidity and a third dew point, wherein the second air handler unit includes the capability of controlling the third temperature, the third relative humidity and the third dew point, and the fourth condition includes a fourth temperature, a fourth relative humidity and a fourth dew point, wherein the third air handler unit includes the capability of controlling the fourth temperature, the fourth relative humidity and the fourth dew point, wherein the second temperature is between about 50° F. and about 68° F., the second relative humidity is between about 19% and about 23%, the second dew point is between about 15° F. and about 30° F., the third temperature is between about 72° F. and about 87° F., the third relative humidity is between about 9% and about 14%, the third dew point is between about 15° F. and about 23° F., the fourth temperature is between about 68° F. and about 74° F., the fourth relative humidity is between about 10% and about 15%, and the fourth dew point is between about 15° F. and about 23° F.

4. The gelatin capsule drying system of claim 3 wherein the first air handler unit is capable of blowing air into the first zone at between about 3000 CFM and about 6000 CFM, wherein the second air handler unit is capable of blowing air into the second zone at between about 2500 CFM and about 5000 CFM, and wherein the third air handler unit is capable of blowing air into the third zone at between about 1000 CFM and about 3000 CFM, wherein the first, second and third air handler units are capable of blowing air into the first second and third zones simultaneously and at different CFMs.

5. The gelatin capsule drying system of claim 1 wherein the series of tumble dryers includes multiple tumble dryers in the first zone, multiple tumble dryers in the second zone, and multiple tumble dryers in the third zone.

6. The gelatin capsule drying system of claim 1 wherein the first, second and third air handler units are positioned within the first, second and third zones, respectively.

7. A method of drying gelatin capsules encapsulating a fill, the method comprising the steps of:
   dividing a space into first, second and third zones,
   providing a first air handler unit for discharging air into the first zone, wherein the first zone includes a first temperature sensor and a first humidity sensor that are both in communication with the first air handler unit,
   a second air handler unit for discharging air into the second zone, wherein the second zone includes a second temperature sensor and a second humidity sensor that are both in communication with the second air handler unit, and
   a third air handler unit for discharging air into the third zone, wherein the third zone includes a third temperature sensor and a third humidity sensor that are both in communication with the third air handler unit,
   providing air to the first air handler unit at a first temperature and a first relative humidity, wherein the air within the first air handler unit is conditioned such that it has a second temperature and a second relative humidity, wherein the conditioned air is blown from the first air handler unit into the first zone,
   providing air to the second air handler unit at the first temperature and the first relative humidity, wherein the air within the second air handler unit is conditioned such that it has a third temperature and a third relative humidity, wherein the conditioned air is blown from the second air handler unit into the second zone,
   providing air to the third air handler unit at the first temperature and the first relative humidity, wherein the air within the third air handler unit is conditioned such that it has a fourth temperature and a fourth relative humidity, wherein the conditioned air is blown from the third air handler unit into the third zone,
   providing a series of tumble dryers that extends from the first zone, through the second zone and into the third, and
   drying the gelatin capsules by moving the gelatin capsules through the tumble dryers from the first zone to the third zone.

8. The method of claim 7 wherein the second temperature is between about 50° F. and about 68° F. and the second relative humidity is between about 19% and about 23%, wherein the third temperature is between about 72° F. and about 87° F. and the third relative humidity is between about 9% and about 14%, wherein the fourth temperature is between about 68° F. and about 74° F. and the fourth relative humidity is between about 10% and about 15%.

9. The method of claim 7 wherein the second temperature is between about 59° F. and about 61° F. and the second relative humidity is between about 20.5% and about 21.5%, wherein the third temperature is between about 81° F. and about 83° F. and the third relative humidity is between about 10.5% and about 11.5%, wherein the fourth temperature is between about 71° F. and about 73° F. and the fourth relative humidity is between about 12.5% and about 13.5%.

10. The method of claim 7 wherein the second temperature is about 60° F. and the second relative humidity is about 21, wherein the third temperature is about 82° F. and the third relative humidity is about 11%, wherein the fourth temperature is about 72° F. and the fourth relative humidity is about 13%.

11. The method of claim 7 wherein the air that is provided to the first, second and third air handler units is provided by a HVAC unit that is positioned outside of the first, second and third zones.

12. The method of claim 7 wherein the air provided to the first, second and third air handler units has a first dew point, wherein the air within the first air handler unit is conditioned such that it has a second dew point, the air within the second air handler unit is conditioned such that it has a third dew point and the air within the third air handler unit is conditioned such that it has a fourth dew point.

13. The method of claim 12 wherein the second dew point is between about 15° F. and about 30° F., the third dew point is between about 15° F. and about 23° F., and the fourth dew point is between about 15° F. and about 23° F.

14. The method of claim 7 wherein the first air handler unit releases the conditioned air into the first zone at between about 3000 CFM and about 6000 CFM, wherein the second air handler unit releases the conditioned air into the second zone at between about 2500 CFM and about 5000 CFM, and wherein the third air handler unit releases the conditioned air into the third zone at between about 1000 CFM and about 3000 CFM.

15. The method of claim 7 wherein the gelatin capsules can be dried to a hardness of eight newtons in about thirteen hours.

16. The method of claim 7 wherein the first, second and third air handler units are positioned within the first, second and third zones, respectively.

17. A method of drying a softgel, the method comprising the steps of:
providing air from an HVAC unit to first, second and third air handler units, wherein the first, second and third air handler units are in communication with first, second and third control panels, respectively and can each blow air therefrom, and wherein the HVAC unit, first air handler unit, second air handler unit and third air handler unit are all controlled independently,
exposing the softgel to the air blown from the first air handler unit,
exposing the softgel to the air blown from the second air handler unit, and
exposing the softgel to the air blown from the third air handler unit.

18. The method of claim 17 wherein the softgel is dried to a hardness of eight newtons in about thirteen hours.

19. The method of claim 17 wherein the first wherein the air provided by the HVAC unit to the first, second and third air handler units is at a first condition that includes a first temperature and a first humidity, the air blown from the first air handler unit is at a second condition that includes a second temperature and a second humidity, the air blown from the second air handler unit is at a third condition that includes a third temperature and a third humidity, and the air blown from the third air handler unit is at a fourth condition that includes a fourth temperature and a fourth humidity, and wherein the first control panel controls the second temperature and the second humidity, the second control panel controls the third temperature and the third humidity, and the third control panel controls the fourth temperature and the fourth humidity.

20. The gelatin capsule drying system of claim 1 wherein the first zone includes a first humidity sensor, wherein the second zone includes a second humidity sensor, and wherein the third zone includes a third humidity sensor, wherein the first air handler unit is in communication with the first humidity sensor, wherein the second air handler unit is in communication with the second humidity sensor, and wherein the third air handler unit is in communication with the third humidity sensor.

21. The method of claim 17 further comprising the steps of positioning the first, second and third air handler units in first, second and third zones, respectively, and providing a series of tumble dryers that extend from the first zone, through the second zone and into the third zone, wherein the series of tumble dryers includes multiple tumble dryers in the first zone, multiple tumble dryers in the second zone, and multiple tumble dryers in the third zone, wherein the step of exposing the softgel to the air blown from the first air handler unit occurs in the first zone and on multiple tumble dryers, wherein the step of exposing the softgel to the air blown from the second air handler unit occurs in the second zone and on multiple tumble dryers, and the step of exposing the softgel to the air blown from the third air handler unit occurs in the third zone and on multiple tumble dryers.

* * * * *